United States Patent [19]

Mukohara

[11] Patent Number: 5,936,789
[45] Date of Patent: Aug. 10, 1999

[54] OFF-TRACK TESTER FOR TESTING MR HEAD AND METHOD OF TESTING THE SAME

[75] Inventor: Noriaki Mukohara, Hadano, Japan

[73] Assignee: Hitachi Electronics Engineering Co., Ltd., Tokyo, Japan

[21] Appl. No.: 08/902,527

[22] Filed: Jul. 29, 1997

[30] Foreign Application Priority Data

Jul. 30, 1996 [JP] Japan .................................. 8-216616

[51] Int. Cl.⁶ .............................................. G11B 5/596
[52] U.S. Cl. .................................. 360/77.04; 360/78.07; 360/75
[58] Field of Search ............................ 360/65, 75, 69, 360/72.1, 76, 77.01, 77.02, 77.04, 77.06, 78.01, 78.04, 78.05, 78.07, 78.08; 369/53, 54, 58, 44.27, 44.32

[56] References Cited

U.S. PATENT DOCUMENTS

| | | | |
|---|---|---|---|
| 4,458,275 | 7/1984 | Monti | 360/78.08 |
| 5,579,119 | 11/1996 | Mimura | 360/65 |
| 5,808,435 | 9/1998 | Mager | 360/78.05 X |

*Primary Examiner*—Muhammad Edun
*Attorney, Agent, or Firm*—Fay, Sharpe, Beall, Fagan, Minnich & McKee

[57] ABSTRACT

An off-track characteristics tester for testing an off-track characteristics of an MR head, according to the present invention, comprises spiral scan type read-out unit for reading out a test data recorded on a track of a disk by spirally scanning the track by the MR head while shifting the MR head radially of the disk at such a shifting rate that the MR head traverses a maximum measuring pitch ΔR necessary to obtain data of an off-track profile curve a plurality of times, average value calculation unit responsive to a read-out signal from the read-out unit to calculate an average value TAA of the test data from the read-out unit every revolution of the disk and a memory for storing the average value TAA for each revolution of the disk together with the radial positions of the MR head, wherein the data of the off-track profile curve is obtained from the average value TAA and the data of the radial positions stored in the memory in every revolution.

10 Claims, 6 Drawing Sheets

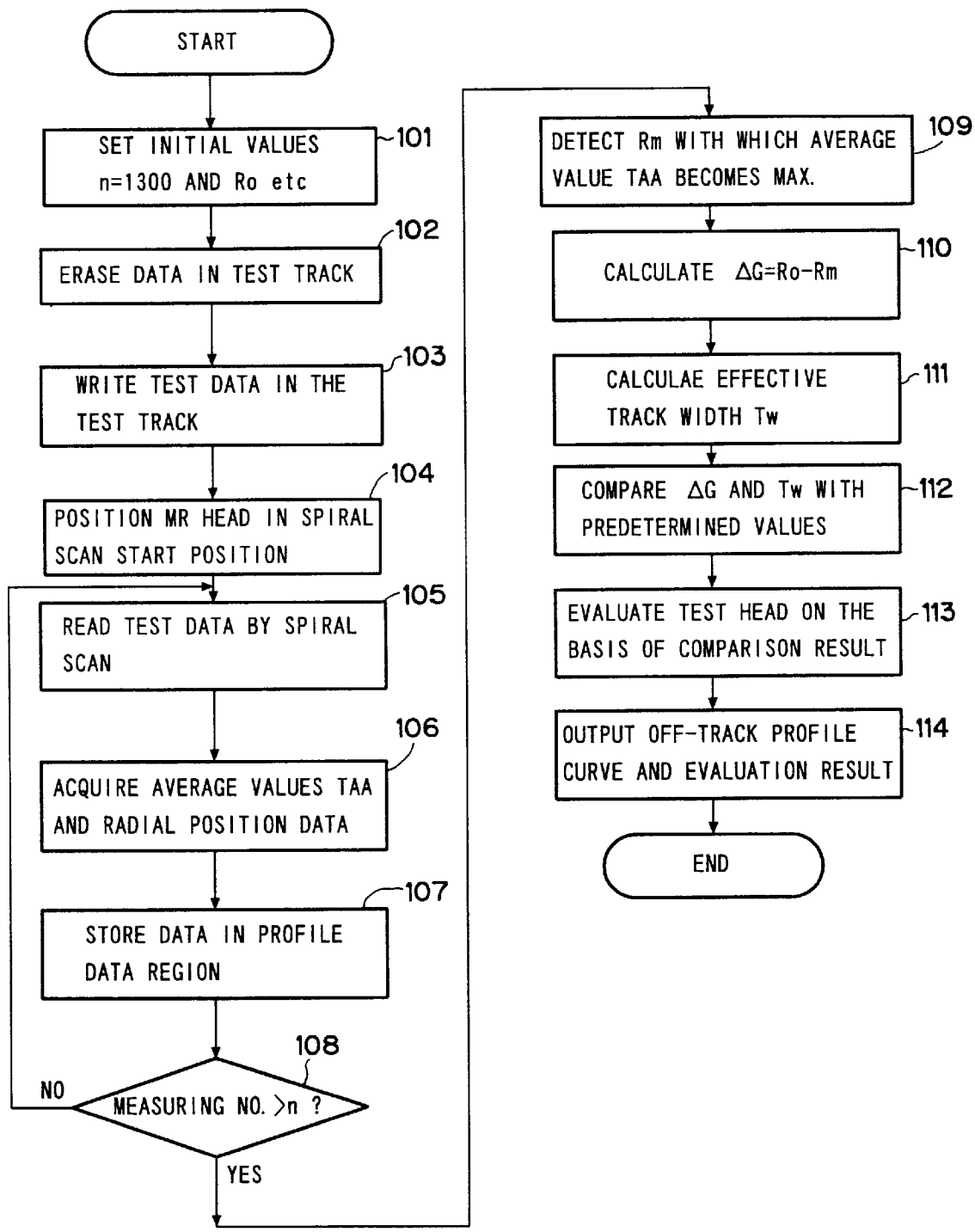

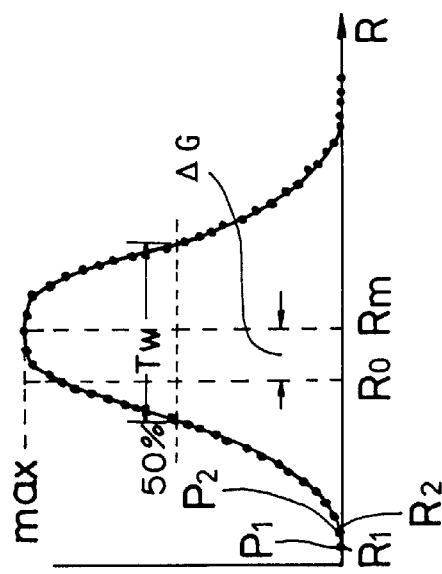
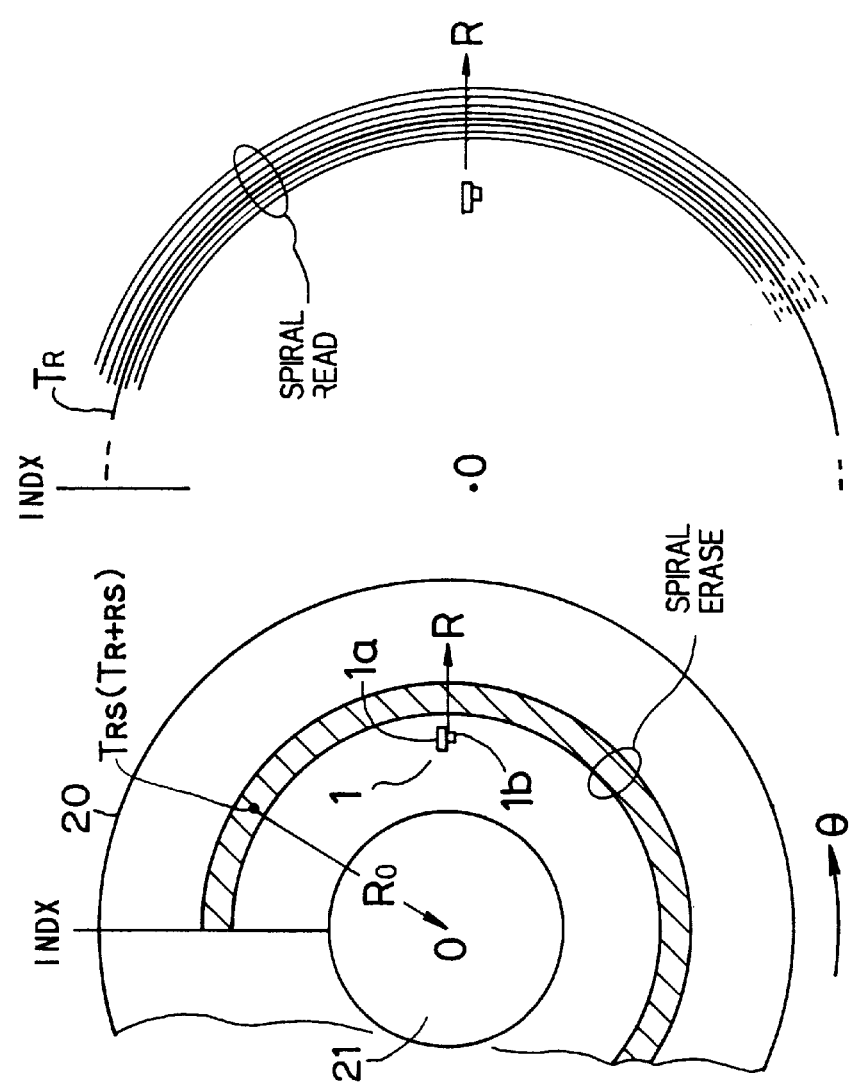
FIG. 3(a) FIG. 3(b) FIG. 3(c)

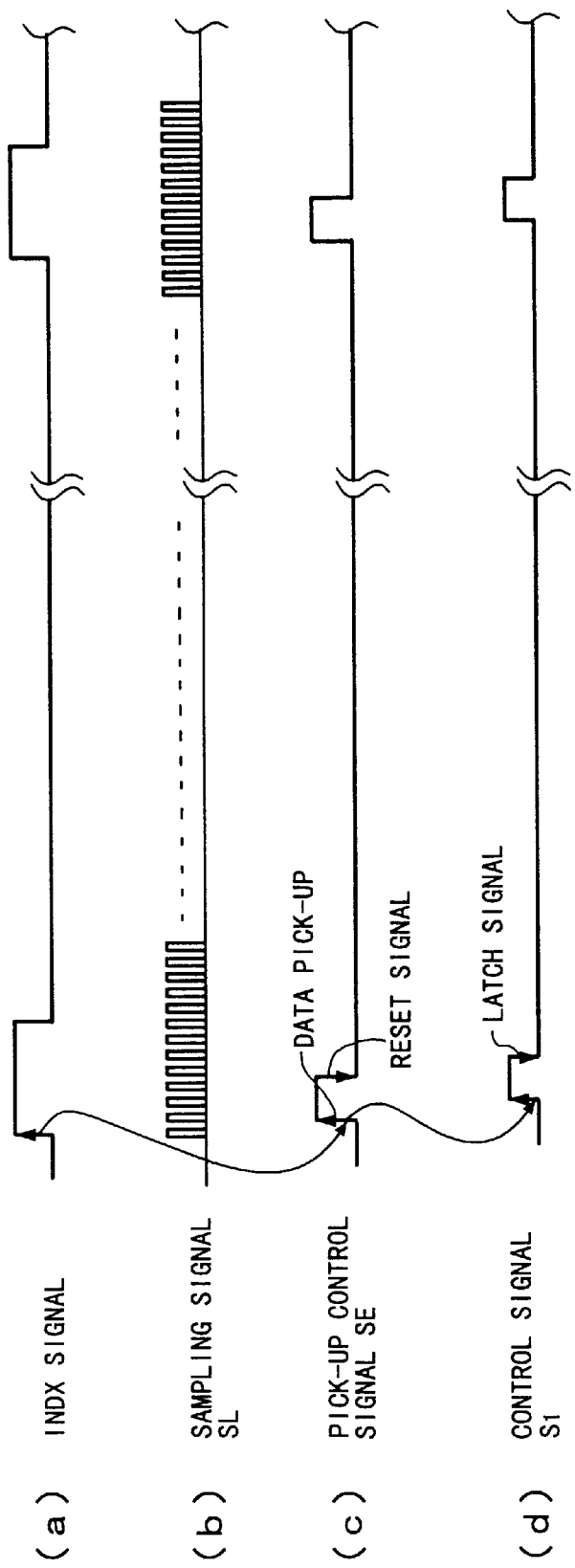

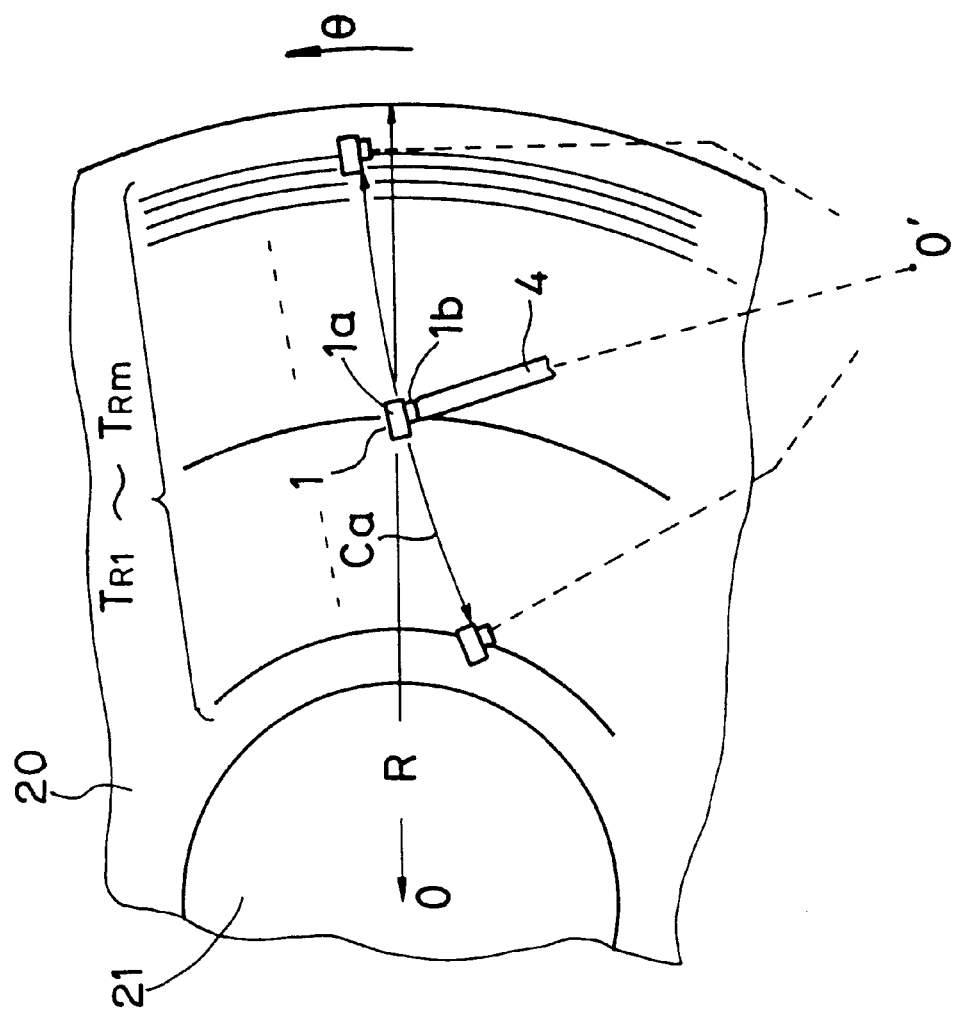
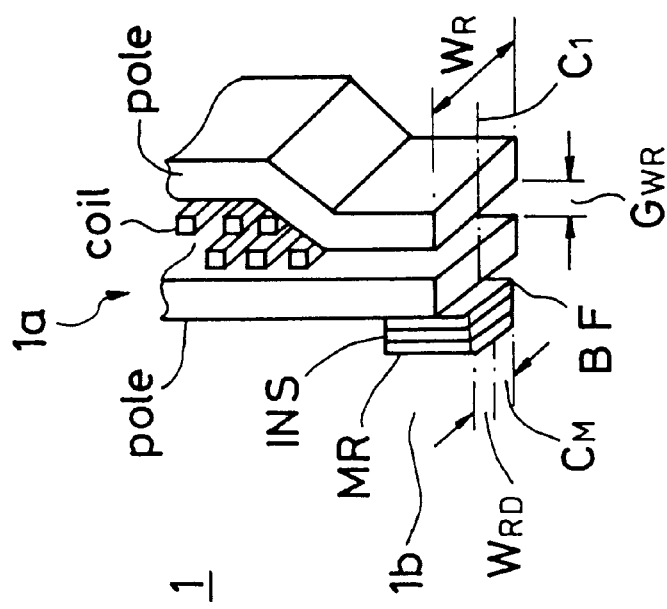
FIG. 5(a)
FIG. 5(b)

OFF-TRACK TESTER FOR TESTING MR HEAD AND METHOD OF TESTING THE SAME

1. DESCRIPTION

2-1. Technical Field

The present invention relates to an off-track tester for testing an off-track of a MR head and a method for testing the same and, in particular, to an off-track tester capable of measuring the off-track characteristics of a MR head within a short time and of improving the test efficiency.

2-2. Background ARt

The magnetoresistance (MR) head has been used as a magnetic head of a hard disk drive compatible with a high density recording. The MR head utilizes a magnetoresistance element having a resistance which is varied according to a magnetic field intensity and is used to read a data written in a magnetic disk. The MR head is combined with a data write head which is a conventional inductive type magnetic head to constitute a composite magnetic head.

FIGS. 5(a) and 5(b) show schematically a composite magnetic head (referred to as merely "head", hereinafter) 1 composed of a thin film inductive head (referred to as "inductive head", hereinafter) 1a and a MR head 1b and a relation between the head 1 and a disk 20, respectively.

FIG. 5(a) is a perspective view of the head 1, in which the inductive head 1a is composed of two magnetic poles each having a width $W_{WR}$, a write gap $G_{ER}$ provided between the magnetic poles and a coil. The MR head 1b is a lamination of a bias magnetic film BF, an insulating film INS and a magnetoresistance element MR. The MR head 1b is arranged in the vicinity of an end of one of the poles of the inductive head 1a. A read width $W_{KD}$ of the MR head 1b is smaller than the write width $W_{WR}$ of the inductive head 1a. Further, center line $C_M$ of the read with $W_{RD}$ of the MR head 1b and a center line $C_I$ of the write width $W_R$ of the inductive head 1a are not aligned for the reason to be described later.

FIG. 5(b) is useful to understand a write and read operations of the head 1 in a disk drive. In FIG. 5(b), a head drive mechanism for moving the head 1 in a direction traversing tracks of the magnetic disk 20 is of a rotary type (not shown) having a rotation center O'. The magnetic disk 20 is mounted on a spindle motor 21 to rotate in a direction θ and has a plurality (m) of tracks $T_{R1}$ to $T_{Rm}$ arranged coaxially. The head 1 is mounted on an end of a head arm 4 and moved along an arc $C_a$ centered at the rotation center O' of the rotary type mechanism. The data write to the tracks $T_{R1}$ to $T_{Rm}$ is performed when the inductive head 1a is positioned in a certain track $T_R$ of the tracks $T_{R1}$ to $T_{Rm}$. On the other hand, the data read from a certain track $T_R$ is performed by the MR head 1b. In the case of the data read, the MR head 1b may be positioned again in the track $T_R$.

Describing the reason for the deviation of the center line $C_M$ of the MR head 1b from the center line $C_I$ of the inductive head 1a, a locus of the head 1 during a seek movement thereof is preferably perpendicular to the respective tracks $T_R$. However, in the rotary system, the head arm 4 moves not perpendicularly to all of the tracks but slightly obliquely to a radial direction R of the disk 20 as shown in FIG. 5(b). Therefore, even if the arc or locus $C_a$ of the head 1 traverses one of the tracks $T_R$ perpendicularly, it does not traverse perpendicularly to the remaining tracks $T_R$. When a track is not perpendicular to the arc $C_a$, positions of the track to be traced by the inductive head 1a and the MR head 1b are deviated from each other dependent upon to a track position accessed by the head 1 and so the MR head 1b becomes the so-called off-track state with respect to the write track position of the inductive head 1a. When an amount of this off-track is excessive, a read error occurs or data in the adjacent tracks are read out erroneously. In order to prevent this problem from occurring, an amount of off-track is restricted as small as possible by preliminarily deviating the center lines $C_M$ and $C_I$ from each other.

The off-track of the MR head 1b with respect to the inductive head 1a occurs due to not only the fact that the arc $C_a$ does not traverse the tracks $T_R$ perpendicularly thereto but also the inaccuracy in size of the MR head 1b and/or the inaccurate mounting position thereof and/or the unevenness of sensitivity of the MR element. Under the circumstance, a total off-track characteristics of the head has been certified by a head tester.

FIGS. 6(a) to 6(c) are useful in understanding the conventional testing method for the off-track characteristics.

Prior to the off-tack characteristics test of the MR head 1b, a suitable sense current is supplied to the MR head 1b. Further, suitable one of the tracks $T_R$ is selected as a test track $T_R$. The test track $T_R$ is usually a track the off-track characteristics for which may be worst in view of the design of the head.

In the off-track characteristics test, the inductive head 1a is positioned in the test track $T_R$ of the disk 20 mounted on the spindle motor 21 and in the adjacent tracks to the test track $T_R$ to erase data on these tracks such that, when the MR head 1b is in the off-track state, residual data in the adjacent tracks is prevented from being read out.

Then, a test data which is, usually, has a plurality of bits all of which are "1" is written in a complete test track $T_R$. In this case, the test data is recorded in a hatched area which is wider than the write width $W_{WR}$ of the inductive head 1a having the center line $C_I$ as shown in FIG. 6(a).

Then, the recorded test data is read out by the MR head 1b while sequentially shifting the position of the MR head 1b. That is, as shown in FIG. 6(a), the position of the MR head 1b is updated sequentially from $R_1, R_2, \ldots$, every time the test data for each complete track is read and the MR head 1b is moved step by step in the radial direction R with a pitch ΔR to read the data on the respective complete tracks at the respective points $R_1, R_2, \ldots$. For each of the points $R_1, R_2, \ldots$, the data is read a plurality of times by scanning the data coaxially. Incidentally, $R_0$ corresponds to a radius of the center line of the track TR in which the test data is written by the inductive head 1a and corresponds to the position on the center line $C_I$ the inductive head 1a substantially. Read-out signals from the MR head 1b positioned at the respective measuring points $R_1, R_2, \ldots$, in the radial direction have waveforms similar to sinusoidal waveforms and amplitudes of the respective waveforms (peak values) are detected. Then, the track average amplitude (TAA) is detected for each track. The track average amplitude TAA will be referred to as merely "average value".

A substantially normal off-track profile curve of the MR head shown by a graph in FIG. 6(b) with the average value TAA and the position of the MR head in the radial direction R being ordinate and abscissa, respectively, is employed as data which is stored in a memory. From the data stored in the memory, a position $R_m$ of the MR head in which the average value TAA becomes maximum is obtained as the radial position corresponding to the center line $C_M$ of the MR head.

Then, an interval ΔG between the position $R_m$ and a position $R_0$ corresponding to the center line $C_I$ of the inductive head 1b and an effective track width $T_w$ in which the average value TAA becomes 50%, etc., are calculated.

These values thus calculated are compared with a predetermined reference value or a predetermined value range and, when these values are within tolerable ranges, the off-track characteristics of the head 1 under test is evaluated as acceptable and, when these values are out of the tolerable ranges, the characteristics is evaluated as not acceptable. Alternatively, it is possible to use a center of the read track obtained from a cross point of extensions of the slopes on both sides of the normal curve as the position $R_m$ correspondingly to the center line of the track on which the MR head is positioned, as shown in FIG. 6(c).

In the conventional test method of the off-track characteristics, however, the precise profile curve is indispensable and, therefore, the MR head 1b must be moved steppingly by the minute distance $\Delta R$ at least 50 times. Further, since the positioning operation of the MR head during the test data is read thereby and the positioning operation thereof to the respective measuring points in the radial direction must be performed independently from each other, the off-track test takes a substantially long time.

3. SUMMARY OF THE INVENTION

An object of the present invention is to provide an off-track characteristics tester for an MR head which can solve the problems inherent to the conventional technology, can measure the off-track characteristics of the MR head within a short time and can improve the test efficiency.

Another object of the present invention is to provide an off-track characteristics test method for an MR head All which can measure the off-track characteristics of the MR head pin within a short time and can improve the test efficiency.

In order to achieve the above objects, the off-track characteristics tester according to the present invention is featured by comprising spiral scan type read-out means for reading out a test data recorded on a track of a disk by spirally scanning the track with an MR head while shifting the MR head radially of the disk at such a rate that the MR head traverses a maximum measuring pitch $\Delta R$ necessary to obtain data of an off-track profile curve a plurality of times, average value calculation means for calculating an average value TAA of data every revolution of the disk on the basis of read-out signals of the test data obtained by spirally scanning the track and memory means for storing the average value TAA of the data for each revolution of the disk in a radial measuring point correspondingly to a radial position of the disk, wherein the data of the off-track profile curve is obtained from data of the radial positions of the measuring points stored in the memory means in every revolution of the disk and data of the average values TAA.

Further, the off-track characteristics test method according to the present invention is featured by comprising the steps of obtaining a read-out signal by reading out a test data recorded on a track of a disk by spirally scanning the track with an MR head while shifting the MR head radially of the disk at such a rate that the MR head traverses a maximum measuring pitch $\Delta R$ a plurality of times, calculating average values TAA of data of the complete track for each measuring point in a radial directions of the disk read out by spirally scanning the track, storing the average values TAA of the data of the respective measuring points of the disk correspondingly to radial positions of the disk and performing the off-track test by using data of the radial positions stored in the memory means in the respective measuring points and data of the average values TAA as the data of the off-track profile curve.

In the conventional coaxial scan, the data of the off-track profile curve are obtained exactly with the pitch $\Delta R$ correspondingly to the radial positions of the track on the disk. On the other hand, when the track is spirally scanned with the pitch $\Delta R$, the average value data obtained for one complete track is obtained not from a certain track at a radial measuring point but from an area including the track and having width of $\Delta R$. Therefore, the average data obtained by the spiral scan can not be used as the data of the off-track profile curve. However, the characteristics of the profile data picked up by spirally scanning the area twice to obtain two average value data and using the two average value data as the profile data corresponding to two radial positions in the spiral scan, respectively, is approximated to the characteristics of the profile data picked up by coaxially scanning an intermediate position of the area. When the number of spiral scans within the area is increased from two, the data of the whole off-track profile curve becomes similar to or closer to the off-track profile curve obtained by using the data picked up by the coaxial scan with the pitch $\Delta R$.

Therefore, it is possible to utilize data obtained by a plurality of spiral scans with the pitch $\Delta R$ as the profile data. The larger the number of spiral scans provides the better result, provided that the test efficiency is not low compared with the case of the coaxial scan.

In such case, it is enough that a time required to pick up data in the spiral scans within the area having width $\Delta R$ is shorter than that required to obtain data by two coaxial scans with the pitch $\Delta R$. In the spiral scan, the scanning is continuous from a start position at which the test data reading is started to a last position at which the test data reading completes. On the other hand, in the coaxial scan, the scanning is interrupted at the respective measuring points and thus the data read processing is interrupted correspondingly, and an additional time is required to restart the scanning and the signal processing.

Practically, however, the spiral scan can perform the off-track profile measurement at a sufficiently higher speed than the conventional measurement even if 10 or more spiral scans are performed in the area having the pitch width of $\Delta R$, and it is possible to pick up enough data of the off-track profile, as will be described with reference to preferred embodiments of the present invention.

As a result, it is possible to measure the off-track characteristics of the MR head within a short time and thus to improve the test efficiency.

4. BRIEF DESCRIPTION OF THE DRAWINGS

FIG. 2 is a flowchart of a test processing performed with the circuit shown in FIG. 1;

Figure 6A:
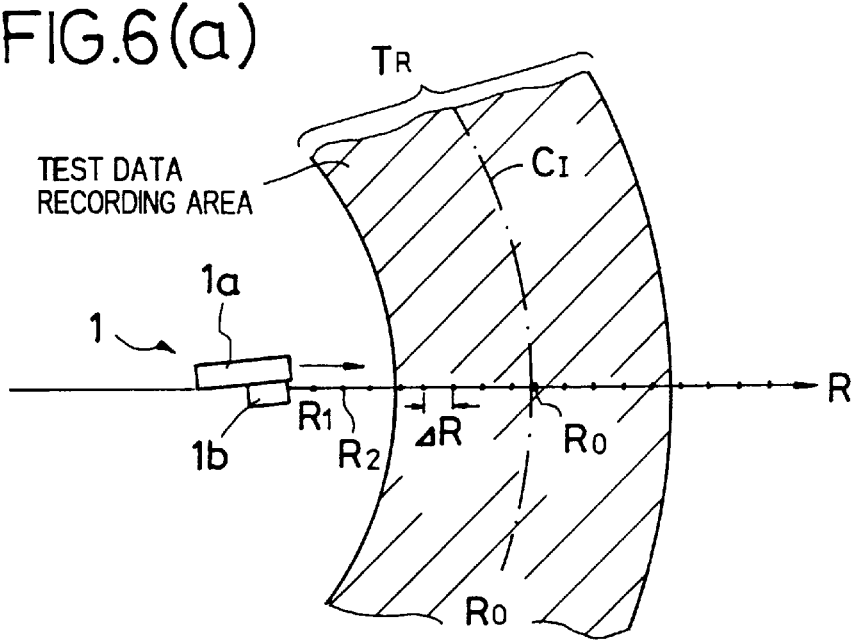
Figure 6B:
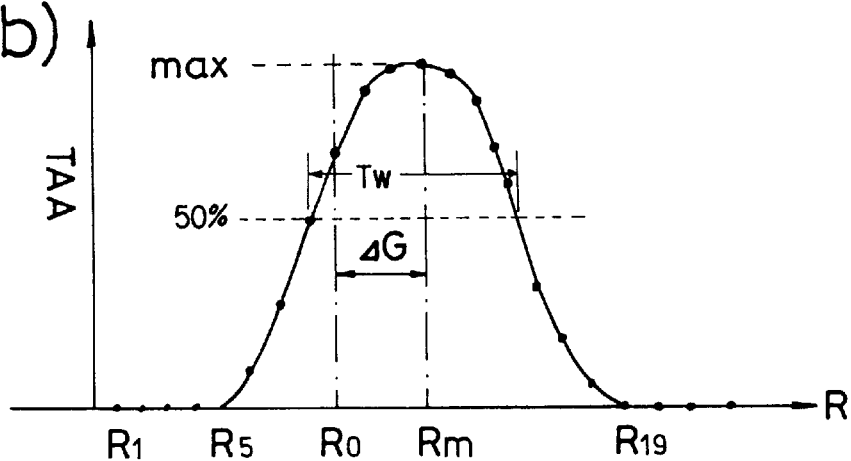
Figure 6C:
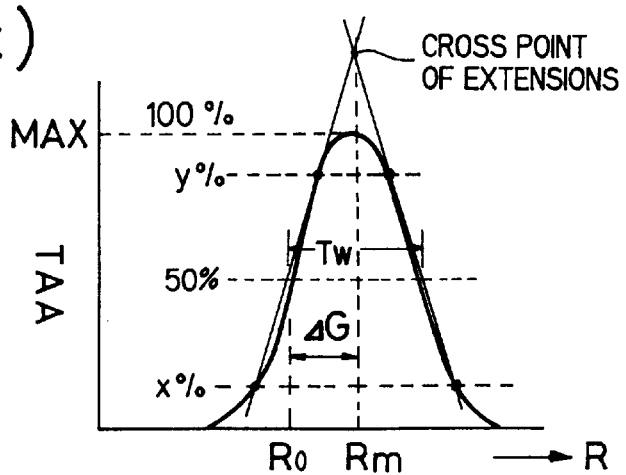

FIGS. 3(a) to 3(c) are figures useful to understand a test method according to the present invention, in which FIG. 3(a) illustrates an erase and write of a test data with respect to a track of a disk, FIG. 3(b) illustrates a read track for the test data and FIG. 3(c) illustrates an evaluation of the off-track characteristics;

FIG. 4 shows waveforms of various timing signals;

FIGS. 5(a) and 5(b) illustrate a relation between a composite MR head and a magnetic disc, in which FIG. 5(a) is a perspective view of the composite MR head and FIG. 5(b) shows a track tracing state of the composite MR head; and FIGS. 6(a) to 6(c) illustrate a conventional test method of the off-track characteristics of a magnetic head, in which FIG. 6(a) is useful to understand an erase and write of a test data with respect to a track, FIG. 6(b) shows a profile curve and FIG. 6(c) illustrates a case where a center of a read track in an MR head is obtained from a cross point between extensions of inclined lines on both sides of the profile.

5. DESCRIPTION OF THE PREFERRED EMBODIMENTS

Figure 1:
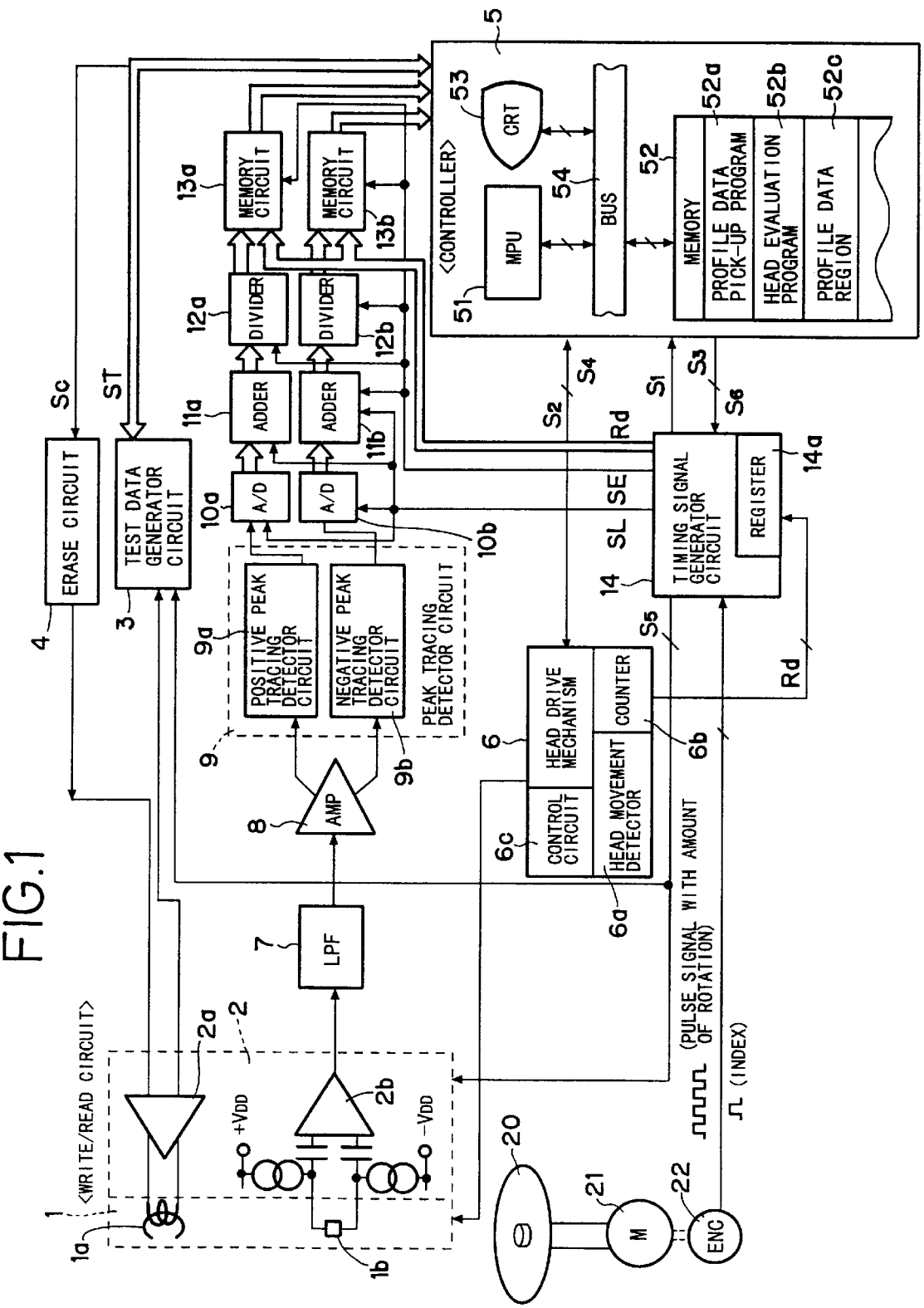
FIG. 1 is a block circuit diagram of an off-track characteristics tester for an MR head, according to the present invention.

In FIG. 1, components having the same constructions as those shown in FIG. 5 are depicted by the same reference numerals as those in FIG. 5, respectively. An inductive head 1a of a composite head 1 to be tested receives a test data from a test data generator circuit 3 through a write circuit 2a of a write/read circuit 2 and writes the test data in a predetermined test track of a disk 20 mounted on a spindle of a motor (M) 21 associated with an encoder (ENC) 22 which produces an index (INDX) pulse signal of the disk 20 and an angle pulse signal indicative of an amount of rotation of the disk 20.

An erase circuit 4 supplies a DC current to the write circuit 2a of the write/read circuit 2 in response to a control signal Sc from a controller 5 to erase data on a test track TR (cf. FIG. 3(a)) and tracks (RS) adjacent on both sides to the test track TR by an inductive head 1a of the composite head 1.

A head drive mechanism 6 includes a positioning mechanism such as a carriage for moving the composite head 1 to the assigned track (the test track TR) of the disk 20.

The head drive mechanism 6 further includes a head movement detector circuit 6a such as an optical scaler for producing a pulse when the head 1 is moved by a predetermined amount radially of the disk 20, a counter 6b for counting pulses from the head movement detector circuit 6a and a control circuit 6c. The head movement detector circuit 6a takes in the form of a rotary encoder extended in a straight line and is adapted to produce a pulse when the head 1 is moved by, in this embodiment, 0.01 $\mu$m as the maximum detecting resolution. The resolution can be set by a signal from the controller 5. The counter 6b counts pulses from the head movement detector circuit 6a to obtain a total amount of movement of the head 1. The count of the counter 6b is stored in a register 14a of a timing signal generator circuit 14 as a radial position data Rd.

The detecting resolution of the head movement detector circuit 6a may be not larger than 0.05 $\mu$m when the maximum measuring pitch $\Delta$R in the profile measurement is 0.1 $\mu$m since the head 1 scans an area having a width of $\Delta$R spirally a plurality of times.

A read circuit 2b of the write/read circuit 2 reads, through an MR head 1b, the test data written in the test track TR by the inductive head 1a. The read circuit 2b amplifies a read signal read out by the MR head 1b. The amplified read signal is supplied to a low-pass filter (LPF) 7 to remove a high frequency noise component thereof and is supplied to a differential amplifier (AMP) 8. The read signal amplified by the differential amplifier 8 and output thereby as two signals having phases different from each other by 180°. The positive phase and negative phase signals from the differential amplifier 8 are supplied to a peak detector circuit 9.

The peak tracing detector circuit 9 includes a positive peak tracing detector circuit 9a which detects peaks on the positive phase side and a negative peak tracing detector circuit 9b which detects peaks on the negative phase side. The positive peak tracing detector circuit 9a receives the positive phase signal from the differential amplifier 8 and the negative peak tracing detector circuit 9b receives the negative phase signal from the differential amplifier 8. Output voltage values of the positive and negative peak tracing detector circuits 9a and 9b are supplied to A/D converter circuits (A/D) 10a and 10b, respectively. The A/D converter circuits 10a and 10b are further supplied with a sampling signal SL from a timing signal generator circuit 14 (cf. FIG. 4(b)) and the output digital signals are sampled by the sampling signal SL by the A/D converter circuits 10a and 10b. The sampled outputs from the A/D converter circuits 10a and 10b are sent to adder circuits 11a and 11b, respectively. Incidentally, the timing signal generator circuit 14 generates the sampling signal SL in the form of pulses having a leading edge and a trailing edge corresponding to a positive phase peak and a negative phase peak, respectively, by frequency-dividing a pulse signal indicative of the amount of rotation of the disk 20 which is supplied from the encoder 22 or an internal clock signal generated in synchronism with the pulse signal.

The adder circuit 11a includes a register for storing a result of a preceding addition and an arithmetic-logic unit (ALU) which receives a voltage value corresponding to the A/D converted positive phase peak value of, for example, 8 bits, adds the voltage value to the result of the preceding addition stored in the register and stores a result of a new addition in the register. By repeating this operation, the adder 11a adds the A/D-converted, positive phase peak voltage values sequentially. Thus, when the disk 20 rotates a complete revolution, the adder 11a generates an added voltage value for one revolution. The adder 11a is reset with a timing corresponding to a trailing edge of a pick-up control pulse signal SE (cf. FIG. 4(c)) generated by the timing signal generator circuit 14 in response to an INDX pulse signal generated after one complete revolution of the disk 20 and restarts the adding operation for a next revolution of the disk.

A divider circuit 12a receives an output value from the adder circuit 11a, divides the output value by the number of positive phase peaks generated for one complete track and outputs a result of the dividing operation as an average value TAA for one track. Since, when it is shifted by 1 bit, the added value becomes a half, it is enough for the dividing operation to obtain a value having a predetermined number of digits. For example, since, when 1024 A/D converted values are sampled for one revolution of the disk, a value which is divided by 1024 is obtained by shifting 10 bits, a value having 10 digits or less need not be used. A data of 11-th and subsequent upper digits becomes a result of the dividing operation.

A memory circuit 13a includes an address counter which is incremented with a leading edge of the pick-up control pulse signal SE (cf. FIG. 4(c)) from the timing signal generator circuit 14. The memory circuit 13a receives the output value of 8 bits of 11th to 18 th digits from the dividing circuit 12a and stores the 8-bit value in respective addresses of the internal memory thereof.

An adder circuit 11b, a dividing circuit 12b and a memory circuit 13b are provided for the negative phase peaks correspondingly to the adder 11a, the dividing circuit 12a and the memory circuit 13a, respectively. That is, the adder circuit 11b adds voltage values of the A/D converted, negative phase peak for one revolution of the disk 20, the dividing circuit 12b generates an average value TAA of the negative phase peak values generated for one track and the memory circuit 13b stores the average values TAA for one track in respective addresses sequentially.

The timing signal generator circuit 14 generates the sampling signal SL in response to the pulse indicative of the amount of revolution and the INDX signal both generated by the rotary encoder 22 and sends the pick-up control signal SE to the memory circuits 13a and 13b assuming that the disk 20 completes one revolution when a next INDX signal is received, so that data of the average value TAA for one track are stored in the memory circuits 13a and 13b together with the radial position data Rd of the track. Thereafter, the timing signal generator circuit sends a control signal $S_1$ to the controller 5 (cf. FIG. 4(d)). In response to the control signal $S_1$ from the timing signal generator circuit 14, the controller 5 reads the average values TAA of the positive and negative phase peak values for one track (one revolution of the disk) together with the radial position data Rd on the disk 20 at the start time of one revolution which are recorded in the memory circuits 13a and 13b and stores them in a memory 52 of the controller 5.

The timing signal generator circuit 14 includes a register 14a for storing the data of the radial positions in which the head 1 is positioned. The register 14a latches the radial position data Rd at the start time of one spiral scan which is sent from the counter 6b of the head drive mechanism 6 with using the trailing edge of the control pulse signal $S_1$ as a latch timing. The radial position data Rd latched by the register 14a is sent to the memory circuits 13a and 13b and stored therein in response to the INDX signal generated by the encoder 22 after the preceding revolution. The radial position data Rd in the register 14a is updated sequentially by new radial position data supplied to the register 14a with the timing of the trailing edge of the control pulse signal $S_1$.

The controller 5 controls the head drive mechanism 6 such that the head 1 is radially moved continuously from a position preceding to the test track TR to spirally scan the tracks to thereby erase data recorded on the test track TR and adjacent tracks thereto, the induction head 1a of the head 1 writes the test data in the test track TR and the MR head 1b of the head 1 reads the test data to obtain data of the off-track profile curve. In order to perform this processing, the controller 5 includes a micro processor unit (MPU) 51, the memory 52 and a display 53 such as cathode ray tube (CRT), etc., which are mutually connected through a bus 54 to which the memory circuits 13a and 13b are also connected.

The memory 52 includes a profile data pick-up program 52a for picking up the profile data by spiral scan, a head evaluation program 52b and a profile data region 52c, etc.

The micro processor unit 51 executes the profile data pick-up program 52a through the steps shown in the flow-chart in FIG. 2.

In FIG. 2, the head 1 to be tested is mounted on the tester and initial values for the test are set in the tester. That is, in order to spirally scan the pitch width ΔR a plurality of times, the number n of the spiral scans for the test track TR and the position (radial position $R_0$) of the test track TR are input to the tester as the initial values (Step 101). In this embodiment, the number n may be 130. Upon a key input of a test start, the micro processor unit 51 sends a control signal Sc to the erase circuit 4 to actuate the latter and sends a control signal $S_2$ to the head drive mechanism 6 to move the head 1 from a position preceding to the test track TR through a suitable range including the test track and tracks adjacent on both sides to the test track, to thereby erase data recorded in these tracks by a DC current by spirally scanning the ranges (Step 102). The erase operation may be performed by the coaxial scan, discretely.

Through the steps 101 and 102, the data recorded in a hatched track portion TRS shown in FIG. 3(a) which includes the test track TR and the tracks adjacent thereto are erased by the spiral scans.

Then, the micro processor unit 51 sends the control signal ST to the test data producing circuit 3 to cause it to produce a predetermined test data. The micro processor unit 51 sends a control signal $S_3$ from the controller 5 to the timing signal generator circuit 14 to write the test data in the whole test track TR (Step 103). Then, the micro processor unit 51 positions the MR head 1b in the start position of the spiral scan of the track TR (Step 104), sends a control signal $S_6$ to the timing signal generator circuit 14 to read the test track TR by spiral scan as shown in FIG. 3(b) (Step 105), obtains data of the average values TAA and the radial position data Rd from the memory circuits 13a and 13b in response to the control signal $S_1$ from the timing signal generator circuit 14 (Step 106) and writes the data in the profile data region 52c sequentially (Step 107).

Describing the positioning of the MR head 1b in the spiral scan start position in the step 104 in detail, the micro processor unit 51 executes the profile data pick-up program 52a by spiral scan to position the head 1 in the test track TR, to write the test data therein, and, thereafter, to step the head 1 back to the spiral scan start position.

In order to do so, the micro processor unit 51 sends a control signal $S_4$ for setting the detection resolution of the detector circuit 6a to, in this embodiment, 0.01 μm in the head drive mechanism 6. Then, the micro processor unit 51 sends a control signal $S_2$ for moving the head 1 by 6.5 μm radially of the disk to the head drive mechanism. Further, the micro processor unit 51 resets the counter 6c of the head drive mechanism to "0". With this processing, the radial position data Rd is obtained in the counter 6c every spiral scan with the resolution of 0.01 μm each time when the disk 20 completes one revolution. Thereafter, the micro processor unit 51 sends the control signal $S_6$ to the timing signal generator circuit 14 to enter into the read operation by spiral scan.

In this embodiment, when a width of the test track TR (one track) is in the order of 10 μm, the read signal can be obtained from an area having a width of about 13 μm and including the test track and some tracks on both sides of the test track. In such case, since the number n of the spiral scans is 1300, about 10 spiral scans are performed for the maximum measuring pitch ΔR of 0.1 μm. For these reasons, the micro processor unit 51 sends the signal for setting the detection resolution of the detector circuit 6a to 0.01 μm to the head drive mechanism 6.

In the read operation by the spiral scan, a suitable sense current is preliminarily supplied to the MR head 1b to be tested. And, as shown in FIG. 3(b), the MR head 1b is moved continuously in a direction shown by R and the test data is read out by the spiral scan for one track.

As described previously, the maximum measuring pitch ΔR is usually about 0.1 μm. Therefore, the MR head 1b is moved in the radial direction R at such a speed that the disk 20 rotates 10 times or more while the head moves by 0.1 μm. In order to obtain such feeding speed of the MR head in the step 105, data of the feeding speed is set in the control circuit 6c of the head drive mechanism 6 from the micro processor unit 51 of the controller 5. As a result, the head 1 moves by a distance of 0.01 μm radially while the disk 20 revolutes once. In FIG. 3(c), this scanning state is shown in an enlarged scale and the disk 20 rotates in a direction 0 as shown in FIG. 3(a).

When the timing signal generator circuit 14 receives the control signal $S_3$ from the controller 5, the timing signal generator circuit 14 sends a predetermined control signal $S_5$ to the write/read circuit 2 and the test data producing circuit 3 to write the test data in the test track TR when the index signal INDX is supplied (cf. FIG. 4(a)). Then, the timing signal generator circuit 14 generates the sampling signal SL, the pick-up control signal SE and the radial position data Rd in response to the control signal $S_6$ from the controller 5 to store the average voltage value in the memory circuits 13a and 13b every revolution of the disk 20 in response to the INDX signal generated every revolution of the disk.

The controller 5 obtains the average value data and the radial position data for 1300 revolutions of the disk 20 from the memory circuits 13a and 13b every time the INDX signal is generated and stores these data in the profile data region 52c thereof. Then, it is determined whether or not the data for 1300 revolutions is acquired (Step 108) and, when it is determined that the data for 1300 revolutions is acquired, the test of the test track TR is deemed as being completed and this processing is completed. When it is determined in the step 108 that the data for 130 revolutions is not acquired as yet, the processing is returned to the step 105.

Then, the micro processor unit 51 completes the acquiring processing of the profile data by the spiral scan through the steps 101 to 108. Incidentally, the average value TAA as the profile data is calculated as (the average value TAA of the positive phase peak value)—(the average value TAA of the negative phase peak value).

Thereafter, the micro processor unit 51 executes the head evaluation program 52b.

FIG. 3(c) is a graph showing a profile data. The profile data shown in FIG. 3(c) is obtained by thinning the actually acquired profile data to one third for simplicity of illustration. In the profile data curve in FIG. 3(c), an ordinate and an abscissa depict the average value TAA and the radial position, respectively. Plot points $p_1, p_2, \ldots$ correspond to the respective radial positions $R_1, R_2, \ldots$ of the disk 20 and the radial position $R_m$ in which the average value TAA becomes maximum corresponds to the center line $C_M$ of the MR head. On the other hand, the preliminarily input radial position $R_0$ is the center of the test track TR and corresponds to the center line $C_I$ of the inductive head 1a. Incidentally, the radial position $R_0$ shown in FIG. 3(c) is transformed into a radial position on the graph of the profile data and in a position at 6.5 μm measured from the start point of the spiral scan because the spiral scan is started at a position preceding the center position of the test track TR by 6.5 μm, as mentioned previously.

First, the micro processor unit 51 detects the radial position $R_m$ in which the average value TAA for one full track becomes maximum, on the basis of the profile data stored in the profile data region 52c (Step 109). Then, the micro processor unit 51 calculates the gap ΔG between the radial position $R_m$ and the radial position $R_0$ which is the center position of the test track TR, as shown in FIG. 3(b), (Step 110) and calculates the effective track width $T_w$ for which the average value TAA becomes 50% (Step 111).

Then, the micro processor unit 51 compares the gap ΔG and the effective track width $T_w$ with predetermined reference values or predetermined ranges, respectively, (Step 112) and performs the evaluation of the head 1 on the basis of results of comparisons (Step 113). The evaluation may be performed such that the off-track characteristics of the head 1 is acceptable when the gap ΔG and the effective track width $T_w$ are within the respective tolerable ranges. Then, the off-track profile curve is produced by the profile data and output to the display 53 or print out by a printer (not shown) together with the result of evaluation (Step 114).

Incidentally, in the step 107, the radial position $R_m$ of the center line $C_M$ of the MR head 1b may be obtained by using a cross point of extensions of the slopes on both sides of the normal curve as shown in FIG. 6(c). Further, a track which has the worst off-track characteristics may be employed as the test track TR, as in the conventional tester.

In the positioning of the MR head 1b in the spiral scan start position in the step 104, it is possible to start the read operation by resetting the counter 6c and then moving the MR head back by 6.5 μm in the radial direction to position the MR head in the spiral scan start position. In such case, the center position of the test track TR corresponds to a position in which the radial position data Rd becomes 0. In this case, the radial position data Rd is given as −6.5 μm when the moving back direction of the MR head is negative and as +6.5 μm when the moving back direction is positive.

In such case, the radial position $R_m$ in which the average value TAA for one track, which is detected in the step 109, becomes maximum becomes the gap ΔG as it is.

The above mentioned processing corresponds to the test method of the present invention. Describing the whole processing of the test method with reference to FIGS. 3(a) to 3(c), in the erase step, the disk 20 mounted on the spindle motor 21 is rotated in the θ direction, the DC erase current is supplied to the inductive head 1a and the inductive head 1a is moved continuously in the R direction as shown in FIG. 3(a). Therefore, the track TRS including the test track TR and tracks adjacent thereto is spirally erased.

Thereafter, in the test data write step, the test data is written in the test track TR by the inductive head 1a in response to the INDX signal output from the rotary encoder 22 provided on the spindle motor 21.

In the test data read step, the MR head 1b is preliminarily supplied with a suitable sense current, the head 1 is continuously moved in the R direction and the test data is read by spirally scanning a plurality of times within the maximum measuring pitch ΔR, as shown in FIG. 3(b). In the average value calculation step, the average values TAA of the positive side peaks and negative side peaks for one revolution of the disk are detected and stored in the memory circuits 13a and 13b together with the radial position data Rd of the disk.

Since the read operation by the spiral scan is continuous, there is no interruption of the read operation due to the stepped or successive movement of the MR head 1b in the conventional tester and so the test period is shortened correspondingly. As mentioned previously, it is possible to obtain the data within a shorter time than in the conventional tester even when the disk is rotated 10 times or more within the maximum measuring pitch ΔR.

Then, in the profile data storing step, the average values TAA and the radial position data Rd of the disk which are stored in the memory circuits 13a and 13b are read as the profile data every revolution of the disk and stored in the memory 52 of the controller 5. Then, in the off-track test step, the gap between the radial position $R_m$ of the center of the MR head and the radial position $R_0$ of the center of the test track on the basis of the profile curve data stored in the memory 52 and the off-track characteristics is evaluated as acceptable when the gap is within the tolerable range or as unacceptable when it is out of the tolerable range. In this case, there is no need of adding the effective width $T_w$ in performing the evaluation.

Although, in this embodiment, the adder circuits and the divider circuits are provided to perform the average value calculation step, the average value TAA may be calculated every disk revolution, that is, every track of the disk, by storing the peak values every disk revolution in the memories as they are and executing the average value calculation program with the micro processor unit 51 on the basis of the data for each disk revolution stored in the memories.

Further, although, in the described embodiment, the average value TAA of amplitude every disk revolution, which includes the positive phase peak values and the negative phase peak values, is obtained, the average value may be for peaks in one of the phases.

In addition, although, in the described embodiment, the radial position data Rd at the start time in one spiral scan is stored in the register 14a of the timing signal generator circuit, a radial position data at the end time in the same spiral scan can be obtained by latching the data in the counter 6c in response to the INDX signal generated at the end time of one spiral scan and this radial position can be used instead of the radial position data Rd at the start time of the spiral scan. Further, an intermediate position data obtained by averaging these two radial position data at the start and end times can be used as the radial position data Rd.

What is claimed is:

1. An off-track characteristics tester for testing an off-track characteristics of an MR head of a composite magnetic head composed of said MR head and an inductive head by reading a test data at a number of measuring points in a radial direction of a magnetic disk with respect to a track of said magnetic disk in which the test data is written, calculating average values of amplitude of a read signal for each said measuring points and obtaining data of an off-track profile of said MR head, said off-track characteristics tester comprising:

spiral scan type read-out means for reading out a test data recorded on tracks of a disk by spirally scanning the tracks with an MR head while shifting said MR head radially of the disk at such a shifting rate that said MR head passes a maximum measuring pitch ΔR necessary to obtain data of an off-track profile curve a plurality of times;

average value calculation means responsive to a read-out signal of the test data to calculate an average value TAA of data every revolution of said disk in the spiral scanning; and memory means for storing the average value TAA of the data for each revolution of said disk correspondingly to a radial position of said disk, wherein the data of the off-track profile curve is obtained from data of the radial positions of said measuring point stored in said memory means in every revolution and data of the average values TAA.

2. An off-track characteristics tester as claimed in claim 1, further comprising position data generator means for generating a position data indicative of the radial position correspondingly to a movement of said MR head, wherein said memory means functions to obtain the radial position for each said measuring point from said position data generator means as the position data and storing the positional data together with the average value for each said measuring point, the radial position for each said measuring point being one selected from the radial position at the start point of the revolution, the radial position at the end point of the revolution and an intermediate position between the start point and the end point.

3. An off-track characteristics tester as claimed in claim 2, further comprising a head drive mechanism including a detector circuit for generating a pulse when said MR head is moved by a predetermined amount, wherein the maximum measuring pitch ΔR is equal to or smaller than 0.1 μm, the detecting resolution of said detector circuit in detecting the movement of said MR head is equal to or smaller than 0.05 μm and said position data generator means generates the position data by counting pulses from said detector circuit.

4. An off-track characteristics tester as claimed in claim 3, further comprising off-track calculator means for calculating a deviation between a radial position determined from a maximum value of the data of the off-track profile curve and the center of said track as an off-track amount and evaluation means for evaluating said magnetic head by comparing the off-track amount calculated by said off-track calculator means with a predetermined reference value.

5. An off-track characteristics tester as claimed in claim 4, further comprising a micro processor and a memory, wherein a portion or whole of said read means, said average value calculator means, said memory means, said off-track calculator means and said evaluation means is realized by said micro processor executing a program stored in said memory.

6. An off-track characteristics tester as claimed in claim 3, further comprising off-track calculator means for calculating a deviation between a radial position of a center determined from the data of the off-track profile curve and the center of said track as an off-track amount and evaluation means for evaluating said magnetic head by comparing the off-track amount calculated by said off-track calculator means with a predetermined reference value.

7. An off-track characteristics tester as claimed in claim 6, further comprising a micro processor and a memory, wherein a portion or whole of said read means, said average value calculator means, said memory means, said off-track calculator means and said evaluation means is realized by said micro processor executing a program stored in said memory.

8. An off-track characteristics testing method for testing an off-track characteristics of an MR head of a composite magnetic head composed of said MR head and an inductive head by reading a test data at a number of measuring points in a radial direction of a magnetic disk with respect to a track of said magnetic disk in which the test data is written, calculating average values of amplitude of a read signal for each said measuring point and obtaining data of an off-track profile of said MR head, said off-track characteristics testing method comprising the steps of:

obtaining a read-out signal by reading out a test data recorded on the track of a disk by spirally scanning said track with said MR head while shifting said MR head radially of said disk at such a shifting rate that said MR head passes a maximum measuring pitch ΔR a plurality of times;

calculating average values of data of said complete track for each said measuring point in the spiral scanning;

storing the average values of the data of said complete track for each said measuring point correspondingly to radial track positions of said disk; and performing the off-track test by using data of said radial positions stored in said memory means in said respective measuring points and data of the average values TAA as the data of the off-track profile curve.

9. An off-track characteristics testing method as claimed in claim 8, further comprising the steps of generating a position data indicative of a radial position of said MR head, obtaining the radial position for each revolution of said disk as the position data and storing the position data together with the average value for each revolution of said disk, wherein the radial position for each revolution is one selected from the radial position at the start point of the revolution, the radial position at the end point of the revolution and an intermediate position between the radial positions.

10. An off-track characteristics testing method as claimed in claim 9, further comprising the steps of generating a pulse every time when said MR head is moved by a predetermined amount of distance, generating the position data by counting the pulses and storing the position data together with the average value for each revolution of said disk, wherein said maximum measuring pitch $\Delta R$ is equal to or smaller than 0.1 $\mu$m and the amount of movement corresponding to one of the pulses is equal to or smaller than 0.05 $\mu$m.

* * * * *